United States Patent Office 3,182,070
Patented May 4, 1965

3,182,070
BENZIMIDAZOLE COMPOUNDS
Clarence L. Moyle, Clare, and Diomed M. Chern, Midland, Mich., assignors to The Dow Chemical Company, Midland, Mich., a corporation of Delaware
No Drawing. Filed May 24, 1962, Ser. No. 197,270
13 Claims. (Cl. 260—309.2)

This invention is directed to benzimidazole compounds, particularly (a) 5-substituted benzimidazole compounds having the formula

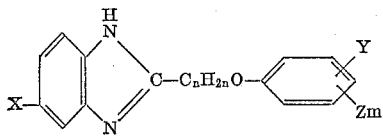

and (b) mineral acid salts of these compounds. In this and succeeding formulas, X is lower alkyl, chloro, bromo, nitro, amino, sulfamyl or phenyl; Y is hydrogen, lower alkyl, lower alkoxy, hydroxy, chloro or bromo; Z is hydrogen, methyl, chloro or bromo; and m and n are integers of from 1 to 2, inclusive. The expression "lower" as above employed indicates a carbon content of from 1 to 4, inclusive.

The products of the present invention are white or light colored solids. The products designated (a) above are soluble in solvents such as acetone, alcohols and dimethylformamide and of low solubility in water and xylene. The products designated (b) above are soluble in dimethylformamide.

The compounds of the present invention have numerous applications. Thus, for example, they are useful as herbicide and adapted to be employed for the control of both aquatic and terrestrial species. The compounds are also useful in exploring certain biological mechanisms in laboratory animals. Certain of the compounds may be employed to explore the vascular effects of various hormones and drugs. Others of the compounds may be employed for the development of a tool for laboratory determination of antiallergenic compounds. The compounds are also adapted to be incorporated in germicidal and antiseptic compositions for the control of microorganisms. The compounds may also be employed to control various water, soil and plat infesting pests.

The products of the present invention may be prepared by reacting an appropriately substituted o-phenylenediamine having the formula

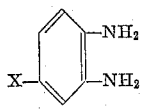

with an appropriate phenoxyalkanoic acid having the formula

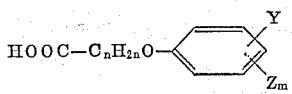

in the presence of acid catalyst to produce the desired benzimidazole compound as its mineral acid salt. If the basic benzimidazole compound itself is desired, the mineral acid salt thus obtained is reacted with an equimolar proportion of base to recover the desired benzimidazole compound.

In carrying out the reaction, the appropriate o-phenylenediamine, phenoxyalkanoic acid and acid catalyst are mixed together for time sufficient to complete the reaction. The exact amount of the reactants is not critical. Good results are obtained by employing substantially equimolar proportions of o-phenylenediamine and phenoxy-alkanoic acid. A reaction takes place at a temperature in the range of from about 80° to about 130° C. Preferably, the reaction is carried out in a solvent; thus, the reflux temperature of the resulting solution provides a convenient reaction temperature. The most suitable solvent is water or mixtures thereof with lower alcohols. The reactant o-phenylenediamines are sometimes available commercially and often as the hydrochloride or other mineral acid salt; such salts are, of course, suitable in the reaction. Certain of the phenoxyalkanoic acids are available as the sodium or other alkali metal salt; such salts may be employed provided a sufficiency of acid catalyst is employed so that the reaction mixture is definitely acid. Any acid, preferably, aqueous mineral acid may be employed. The choice of acid may depend on the particular acid salt desired. Thus, the acid may be hydrochloric, hydrobromic, phosphoric or sulfuric. If the basic benzimidazole compound per se is desired, hydrochloric acid is convenient. The reaction is complete in from about 15 to 48 hours. As the result of these operations, the mineral acid salts of the benzimidazole compounds precipitates in the reaction mixture and is recovered and if desired, purified according to conventional procedures. The basic benzimidazole may be obtained from the mineral acid salt by reacting the salt with a substantially equimolar proportion of a base. Suitable bases include ammonium hydroxide, sodium hydroxide, sodium carbonate, etc. The reaction is carried out by mixing the salt with an aqueous solution of the base, usually by warming. The temperature is not critical and will usually be the boiling point of the solvent such as ethanol, if employed, or up to the boiling point of water. When the mixture is cooled, the desired benzimidazole compound precipitates in the reaction mixture and may be recovered by filtration and purified, if desired, according to conventional procedures such as by treating with activated charcoal and by recrystallization from hot aqueous or lower alcohol solution.

In a preferred method for carrying out this reaction, substantially equimolar proportions of the appropriate o-phenylenediamine and the appropriate phenoxylalkanoic acid are mixed together in dilute hydrochloric acid and heated at reflux temperature for from about 15 to 30 hours. At the end of this period, the mixture is allowed to cool to room temperature to obtain a benzimidazole hydrochloride product as a precipitate. The latter is recovered by filtration and purified, if desired, by conventional procedures. The hydrochloride may be converted to the benzimidazole by heating substantially equimolar proportions of the hydrochloride and ammonia in alcohol-water for several hours and then cooling whereupon the desired benzimidazole compound precipitates in the mixture. The product is recovered and purified according to conventional methods.

The following examples illustrate the invention but are not to be construed to be limiting:

EXAMPLE 1

5-methyl-2-phenoxymethylbenzimidazole and hydrochloride

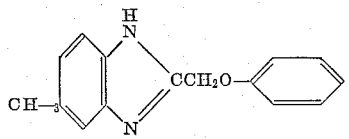

38 grams (0.25 mole) of phenoxyacetic acid, 48.8 grams (0.25 mole) of 3,4-toluenediamine dihydrochloride, 30 milliliters of concentrated hydrochloric acid, 60 milliliters of water and 30 milliliters of 95% ethanol were mixed together and heated at reflux temperature for 5.5 hours under an atmosphere of nitrogen. As a result of these operations, a reaction took place with the formation of an oil which precipitated in the reaction mixture. About 1000 milliliters of water was added to the mixture and mixture heated to dissolve the oil, and thereafter, allowed to cool to obtain a crude 5-methyl-2-phenoxymethylbenzimidazole hydrochloride product as a white solid. The latter was purified by treating an aqueous solution thereof with activated charcoal and recrystallized from water to obtain a purified hydrochloride product melting from 198° to 202° C.

The hydrochloride was suspended in water and sodium bicarbonate added to the aqueous mixture to obtain a basic 5-methyl - 2 - phenoxymethylbenzimidazole product as a pink solid. The latter was recrystallized from isopropyl alcohol-water mixture to obtain a purified product as white, fluffy, crystalline solid melting at 173.5° C.

EXAMPLE 2

*5-chloro-2-phenoxymethylbenzimidazole and hydrochloride*

In a manner similar to that above described, 30.2 grams (0.22 mole) of 4-chloro-o-phenylenediamine, 30.4 grams (0.2 mole of phenoxyacetic acid, 20 milliliters of water, and 20 milliliters of concentrated hydrochloric acid were mixed together and heated at reflux temperature 24 hours. At the end of this period, 1 liter of boiling water was added to the mixture, and the mixture then allowed to cool to obtain a 5-chloro-2-phenoxymethylbenzimidazole hydrochloride product as a white crystalline solid melting at 245–246° C.

The hydrochloride was suspended in water and aqueous sodium hydroxide added thereto until the mixture had a pH of 6 to obtain a 5-chloro-2-phenoxymethylbenzimidazole product. The latter after purification with activated charcoal and recrystallization from benzene melted at 131.5° C.

EXAMPLE 3

*2-(2,4-dichlorophenoxymethyl)-5-methylbenzimidazole hydrochloride*

In a similar manner, 22.1 grams (0.1 mole) of 2,4-dichlorophenoxyacetic acid, 19.5 grams (0.1 mole) of 3,4-toluenediamine dihydrochloride, 40 milliliters of water and 10 milliliters of concentrated hydrochloric acid were mixed and heated for 22 hours at reflux temperature. At the end of this period, the reaction mixture was cooled to room temperature whereupon crude solid product precipitated in the reaction mixture. The solid was recovered by filtration, washed with water and recrystallized from ethanol-water to obtain a 2-(2,4-dichlorophenoxymethyl)-5-methylbenzimidazole hydrochloride product as pale green crystals melting at 232–232.5° C.

EXAMPLE 4

*2-(p-methoxyphenoxymethyl)-5-methylbenzimidazole*

In a similar manner, 18.2 grams (0.1 mole) of p-methoxyphenoxyacetic acid, 19.5 grams (0.1 mole) of 3,4-toluenediamine dihydrochloride, 40 milliliters of water and 10 milliliters of concentrated hydrochloric acid were mixed together and heated at reflux temperature for 20 hours. At the end of this period, the mixture was cooled whereupon crude 2-(p-methoxyphenoxymethyl)-5-methylbenzimidazole hydrochloride precipitated in the reaction mixture as a pale green solid having a molecular weight of 326. The solid was dissolved in hot ethanol and aqueous ammonium hydroxide to obtain 2-(p-methoxyphenoxymethyl)-5-methylbenzimidazole product which after recrystallization from aqueous ethanol was a white crystalline solid melting at 140–141° C.

EXAMPLE 5

*5-methyl-2-(3,5-xylyloxymethyl)benzimidazole*

19.5 grams (0.1 mole) of 3,4-toluenediamine dihydrochloride, 20.2 grams (0.1 mole) of sodium 3,5-dimethylphenoxyacetate, 135 milliliters of 2 normal hydrochloric acid and 25 milliliters of ethanol were heated together at reflux temperature for 22 hours. At the end of this period, the reaction mixture was allowed to cool whereupon crude 5-methyl-2-(3,5-xylyloxymethyl)benzimidazole hydrochloride precipitated in the reaction mixture. The latter was recovered by filtration and the solid heated in aqueous, alcoholic ammonium hydroxide to obtain a 5-methyl-2-(3,5-xylyloxymethyl)benzimidazole product as tan colored crystals having a melting point of 192.5–193° C.

EXAMPLE 6

In operations carried out in a manner similar to that previously described, 2-aryloxyalkyl-5-methylbenzimidazoles or their hydrochlorides identified in Table I were prepared from the appropriate aryloxyalkanoic acid or its salt and 3,4-toluenediamine dihydrochloride by heating together in aqueous hydrochloric acid solution.

TABLE I

| Compound | Melting Point (° C.) |
| --- | --- |
| 5-Methyl-2-(2-(3,5-xylyloxy)ethyl)benzimidazole | 138–139 |
| 5-Methyl-2-(3,4-xylyloxymethyl)benzimidazole | 150 |
| 2-(2-Ethoxyphenoxymethyl)-5-methylbenzimidazole | 91.5–98.5 |
| 2-(2-Ethoxyphenoxymethyl)-5-methylbenzimidazole, hydrochloride hydrate | 80.5–84.5 |
| 2-(3-Ethoxyphenoxymethyl)-5-methylbenzimidazole | 162–163.5 |
| 2-(4-Ethoxyphenoxymethyl)-5-methylbenzimidazole | 154–155 |
| 2-(2-Ethylphenoxymethyl)-5-methylbenzimidazole | 135–136 |
| 2-(4-Ethylphenoxymethyl)-5-methylbenzimidazole | 165 |
| 5-Methyl-2-(o-toloxymethyl)benzimidazole | 149–149.5 |
| 5-Methyl-2-(m-toloxymethyl)benzimidazole | 173.5–174 |
| 5-Methyl-2-(p-toloxymethyl)benzimidazole | 181.5–182 |
| 2-(2-Methoxyphenoxymethyl)-5-methylbenzimidazole hydrochloride | 220–235 |
| 2-(2-Methoxyphenoxymethyl)-5-methylbenzimidazole | 105.5–107.5 |
| 2-(3-Methoxyphenoxymethyl)-5-methylbenzimidazole | 62.5–63.5 |
| 2-(4-Chloro-2-methylphenoxymethyl)-5-methylbenzimidazole | 133.5–135 |
| 2-(2-Chlorophenoxymethyl)-5-methylbenzimidazole | 156 |
| 2-(o-Cumenyloxymethyl)-5-methylbenzimidazole | 162 |
| 2-(p-Cumenyloxymethyl)-5-methylbenzimidazole | 168.9 |
| 2-(2-Methoxy-4-methylphenoxymethyl)-5-methylbenzimidazole | 91.5–98.5 |
| 5-Methyl-2-(2-thymyloxymethyl)benzimidazole | 142 |
| 2-(3-Hydroxyphenoxymethyl)-5-methylbenzimidazole | 131–132.5 |
| 2-(4-Chlorophenoxymethyl)-5-methylbenzimidazole hydrochloride | 228–229 |
| 2-(2,6-Dichlorophenoxymethyl)-5-methylbenzimidazole hydrochloride | 208.5 |
| 2-(2-sec.-Butylphenoxymethyl)-5-methylbenzimidazole | 144.5–146 |
| 2-(3-Ethyl-5-methylphenoxymethyl)-5-methylbenzimidazole hydrochloride | 195–196 |
| 2-(6-Chloro-o-toloxymethyl)-5-methylbenzimidazole hydrochloride | 200.5–202 |
| 2-(3,5-Dibromophenoxymethyl)-5-methylbenzimidazole hydrochloride | 278–279 |
| 5-Methyl-2-(2,5-xylyloxymethyl)benzimidazole | 195.5–196 |
| 5-Methyl-2-(2,4-xylyloxymethyl)benzimidazole | 160–161 |
| 2-Mesityloxymethyl-5-methylbenzimidazole hydrochloride | 231.5–232.5 |

EXAMPLE 7

In similar operations to that described in Example 6, 5-methyl-2-(2,6 - xylyloxymethyl)benzimidazole was obtained as an amorphous solid having a molecular weight of 252 and 5-methyl-2-(1-phenoxyethyl)-benzimidazole was obtained as a solid which started to flow on heating at 70° C. and had a molecular weight of 238.

EXAMPLE 8

In similar operations, 2-aryloxylmethyl-5-alkylbenzimidazoles are prepared:

5-ethyl-2-(p - toloxymethyl)benzimidazole melting at 147° C. by the reaction of 4-ethyl-o-phenylenediamine (M.P. 57.5–59° C.) and p-toloxyacetic acid (M.P. 139.5–139.7° C.) in hydrochloric acid, followed by the neutralization of the hydrochloride with aqueous ammonia.

5-ethyl-2-(3,5-xylyloxymethyl)benzimidazole melting at 160° C. by the reaction of 4-ethyl-o-phenylenediamine and 3,5-xylyloxyacetic acid in hydrochloric acid, followed by the neutralization of the hydrochloride with aqueous ammonia.

2-(2-ethoxyphenoxymethyl)-5 - ethylbenzimidazole hydrochloride melting at 215–218° C. by the reaction of 4- ethyl-o-phenylenediamine and 2-ethoxyphenoxyacetic acid (M.P. 71–72.3° C.) in hydrochloric acid.

2-(2,4-dichlorophenoxymethyl)-5 - isopropylbenzimidazole hydrochloride having a molecular weight of 361 by the reaction of 4-isopropyl-o-phenylenediamine dihydrochloride and 2,4-dichlorophenoxyacetic acid in hydrochloric acid.

5-tert.-butyl-2-(2-chloro - 4 - methylphenoxymethyl)-benzimidazole hydrochloride having a molecular weight of 357 by the reaction of 4-tert.-butyl-o-phenylenediamine dihydrochloride and 2-chloro-4-methylphenoxyacetic acid in hydrochloric acid.

5-sec.-butyl-2-(4-sec. - butoxyphenoxymethyl)benzimidazole hydrochloride having a molecular weight of 373 by the reaction of 4-sec.-butyl-1,2-phenylenediamine dihydrochloride and 4-sec.-butoxyphenoxyacetic acid in hydrochloric acid.

2 - (2,4 - dibromophenoxymethyl)-5-n-propylbenzimidazole hydrochloride having a molecular weight of 453 by the reaction of 4-n-propyl-o-phenylenediamine dihydrochloride and 2,4-dibromophenoxyacetic acid in hydrochloric acid.

2-(4 - isopropoxyphenoxymethyl)-5-isopropylbenzimidazole hydrochloride having a molecular weight of 345 by the reaction of 4-isopropyl-o-phenylenediamine dihydrochloride and 4-isopropoxyphenoxyacetic acid in hydrochloric acid.

EXAMPLE 9

5-chloro-2-(1-phenoxyethyl)benzimidazole 30.2 grams (0.22 mole) of 4-chloro-o-phenylenediamine, 37.6 grams (0.2 mole) of sodium 2-phenoxypropionate and 90 milliliters of 4 normal hydrochloric acid were heated together for 21 hours at reflux temperature. The hot reaction mixture was diluted with aqueous hydrochloric acid and the resulting mixture allowed to cool to room temperature whereupon 5-chloro-2-(1-phenoxyethyl)benzimidazole hydrochloride precipitated. The latter was recovered by filtration, and reacted with aqueous ammonia to obtain the 5-chloro-2-(1-phenoxyethyl)benzimidazole product which after recrystallization from aqueous ethanol melted at 143–144° C.

EXAMPLE 10

In operations carried out in a similar manner, 2-aryloxyalkyl-5-chlorobenzimidazoles or their hydrochlorides identified in Table II were prepared from the appropriate aryloxylalkanoic acid or its salt and 4-chloro-o-phenylenediamine by heating together in aqueous hydrochloric acid solution.

TABLE II

| Compound | Melting Point (° C.) |
|---|---|
| 5-Chloro-2-(p-toloxymethyl)benzimidazole | 166–167 |
| 5-Chloro-2-(2,4,5-trichlorophenoxymethyl)-benzimidazole | 216–217 |
| 5-Chloro-2-(4-chlorophenoxymethyl)benzimidazole | 189–190.5 |
| 5-Chloro-2-(4-ethoxyphenoxymethyl)benzimidazole | 133–140 |
| 5-Chloro-2-(3,5-xylyloxymethyl)benzimidazole | 163.5–164.5 |
| 5-Chloro-2-(4,6-xylyloxymethyl)benzimidazole | 132–133 |

EXAMPLE 11

5-nitro-2-(p-toloxymethyl)benzimidazole 12.9 grams (0.1 mole) of 4-nitro-o-phenylenediamine, 16.6 grams (0.1 mole) of p-toloxyacetic acid and 70 milliliters of 4 normal hydrochloric acid were heated together at reflux temperature for 24 hours. The mixture was then allowed to cool whereupon 5-nitro-2-(p-toloxymethyl)-benzimidazole hydrochloride precipitated in the reaction mixture. The latter was recovered by filtration and heated with aqueous, alcoholic ammonia to obtain a 5-nitro-2-(p-toloxymethyl)benzimidazole which after recrystallization from aqueous ethanol melted at 214.5°–215.3° C.

EXAMPLE 12

2-phenoxymethyl-5-benzimidazolesulfonamide 8.0 grams (0.043 mole) of 4-sulfamyl-1,2-phenylenediamine, 8.0 grams (0.053 mole) of phenoxyacetic acid and 60 milliliters of 4 normal hydrochloric acid were heated together at reflux temperature for 48 hours. The mixture was allowed to cool to recover 2-phenoxymethyl-5-benzimidazolesulfonamide hydrochloride and the latter reacted with aqueous ammonia as previously described to obtain the desired 2-phenoxymethyl-5-benzimidazolesulfonamide product melting at 213°–215° C.

EXAMPLE 13

In operations carried out in the manner above described, the following compounds are prepared:

2-(4-ethoxyphenoxymethyl)-5-nitrobenzimidazole having a melting point of 148.5–149.5° C. by the reaction of 4-nitro-o-phenylenediamine and 4-ethoxyphenoxyacetic acid in hydrochloric acid followed by reaction with aqeous ammonia.

2-(3,5 - xylyloxymethyl) - 5 - benzimidazolesulfonamide melting at 172–174° C. by the reaction of 4-sulfamyl-o-phenylenediamine and 3,5-xylyloxyacetic acid in hydrochloric acid followed by reaction with aqueous ammonia.

2 - (o-toloxymethyl)-5-benzimidazolesulfonamide melting at 273–275° C. by the reaction of 4-sulfamyl-o-phenylenediamine and o-toloxyacetic acid in hydrochloric acid followed by reaction with aqueous ammonia.

2 - (2 - ethoxyphenoxymethyl) - 5 - benzimidazolesulfonamide melting at 108–111° C. by the reaction of 4-sulfamyl-o-phenylenediamine and 2-ethoxyphenoxyacetic acid in hydrochloric acid followed by reaction with aqueous ammonia.

5 - phenyl-2-(3,5-xylyloxymethyl)benzimidazole hydrochloride melting at 255–257° C. by the reaction of 4-phenyl-o-phenylenediamine and 3,5 - xylyloxyacetic acid in hydrochloric acid.

2-(o-cumenyloxymethyl)-5-nitrobenzimidazole having a molecular weight of 311 by the reaction of 4-nitro-o-phenylenediamine and o-cumenyloxyacetic acid in hydrochloric acid followed by reaction with aqueous ammonia.

2 - (6 - chloro-o-toloxymethyl) - 5 - benzimidazolesulfonamide hydrochloride having a molecular weight of 372 by the reaction of 4 - sulfamyl-o-phenylenediamine and 2-chloro-o-toloxyacetic acid in hydrochloric acid.

2 - (3 - hydroxyphenoxymethyl)-5-phenylbenzimidazole hydrochloride having a molecular weight of 340 by the reaction of 5-phenyl-o-phenylenediamine and 3-hydroxyphenoxyacetic acid in hydrochloric acid.

2 - (2,4,5 - tribromophenoxymethyl) - 5 - phenylbenzimidazole hydrochloride having a molecular weight of 561 by the reaction of 5-phenyl-o-phenylenediamine and 2,4,5-tribromophenoxyacetic acid in hydrochloric acid.

5-bromo-2-phenoxymethylbenzimidazole hydrochloride having a molecular weight of 339.5 by the reaction of 5-bromo-o-phenylenediamine and phenoxyacetic acid in hydrochloric acid.

5-bromo-2-(4-ethoxyphenoxymethyl)benzimidazole hydrochloride having molecular weight of 383 by the reaction of 5 - bromo-o-phenylenediamine and 4 - ethoxyphenoxyacetic acid in hydrochloric acid.

5 - bromo - 2 - (2 - (3,5 - dichlorophenoxy)ethyl)benzimidazole hydrochloride having a molecular weight of 426 by the reaction of 4-bromo-o-phenylenediamine and 3-(3,5-dichlorophenoxy)propionic acid in hydrochloric acid.

5 - isobutyl-2-(2-mesityloxyethyl)benzimidazole hydrochloride having a molecular weight of 364 by the reaction of 4-isobutyl-o-phenylenediamine and 3-mesityloxypropionic acid in hydrochloric acid.

2-(1-phenoxyethyl)-5-phenylbenzimidazole hydrochloride having a molecular weight of 340 by the reaction of 4-phenyl-o-phenylenediamine and 2-phenoxypropionic acid in hydrochloric acid.

2 - (1 - (2,4 - dichlorophenoxy)ethyl) - 5 - nitrobenzimidazole hydrochloride having a molecular weight of 352 by the reaction of 4-nitro-o-phenylenediamine and 2-(2,4-dichlorophenoxy)propionic acid in hydrochloric acid followed by reaction with aqueous ammonia.

EXAMPLE 14

*5-amino-2-(p-ethoxyphenoxymethyl)benzimidazole and dihydrochloride*

20 grams of 2-(4-ethoxyphenoxymethyl)-5-nitrobenzimidazole prepared as set forth in Example 13 was reduced with hydrozen at 500 pounds pressure and at temperatures of from about 15° to 30° C. in the presence of 5 grams of Raney nickel catalyst and 100 milliliters of absolute ethanol to obtain 5-amino-2-(p-ethoxyphenoxymethyl)benzimidazole having a molecular weight of 283. The product thus obtained reacted with hydrochloric acid to produce a 5-amino-2-(p-ethoxyphenoxymethyl)benzimidazole dihydrochloride product melting at 175° C. with decomposition.

EXAMPLE 15

In operations carried out in a manner similar to that described in Example 14, the following compounds are prepared:

2 - amino-2-(o-cumenyloxymethyl)benzimidazole dihydrochloride having a molecular weight of 354 by the reduction of 2-(o-cumenyloxymethyl) - 5 - nitrobenzimidazole.

5 - amino - 2 - (1 - (2,4 - dichlorophenoxy)ethyl)benzimidazole dihydrochloride having a molecular weight of 395 by the reduction of 2 - (1 - (2,4 - dichlorophenoxy)ethyl-5-nitrobenzimidazole.

EXAMPLE 16

The following mineral acid salts are prepared by reacting substantially equimolar proportions of the benzimidazole compound prepared as previously described and the appropriate mineral acid by mixing together in aqueous medium and warming together on a steam bath, cooling to obtain the salt as a precipitate and recovering by filtration: 2-(o-cumenyloxymethyl)-5-nitrobenzimidazole .HBr, M.W. 385; 2-(4-chloro-o-toloxymethyl)-5-benzimidazolesulfonamide.$H_2SO_4$, M.W. 434.

The products of the present invention are useful for the control of agricultural pests. They are useful for the control of the growth of undesirable vegetation, both aquatic and terrestrial. Thus, for example, they are useful as aquatic herbicides for the control of such species as Cabomba, moneywort, Salvinia, Anacharis sp. or coontail. For example, good controls of Cabomba, Salvinia and coontail species may be obtained by exposing the aquatic weeds for about two hours to a tank containing 100 parts per million of 5-methyl-2-(2-(3,5-xylyloxy) ethyl)benzimidazole or 2-(4-methoxyphenoxymethyl)-5-methylbenzimidazole. As terrestrial herbicides, the compounds are useful in both pre-emergent and post-emergent applications, for the control of both seeds and emergent plants. Both broadleafs and grasses are controlled by the benzimidazole compounds; thus, controls have been obtained on radish, Japanese millet, wild oats, sorghum, peas, tomato and bean species. An example of control of pre-emergent seed is control of radish and sorghum seeds when 2-(2,4-dichlorophenoxymethyl)-5-methylbenzimidazole or 5-chloro - 2 - (1 - phenoxyethyl) benzimidazole is applied at a dosage of 50 pounds per acre to soil planted with the seeds.

The compounds may be employed for the control of trash fish or other aquatic pests. It is found that complete controls of lake emerald shiner are obtained when said species is contacted with an aqueous medium containing one part per million by weight of 5-methyl-2-(3, 4 - xylyloxymethyl)benzimidazole or 5-methyl-2-(2-(3,5-xylyloxy)ethyl)benzimidazole.

Plant-infesting pests, especially aphids and mites are controlled by the benzimidazoles of the present invention. Examples of pest species which have been controlled by the benzimidazoles include cotton aphids, bean aphids and 2-spotted spider mites. The compounds are also useful for the control of certain soil-dwelling fungi such as *Monilia fructicola* and *Alternaria solani*.

The compounds are also adaptable for use in germicidal compositions. Good controls of bacterial and fungal species such as *Aerobacter aerogenes, Bacillus subtilis, Pseudoaeroginosa, Salmonella typhosa, Staphylococcus aureus, Aspergillus terreus* and *Pullularia pullulans* have been obtained. In a representative operation for such use, 2-(2,4-dichlorophenoxymethyl)-5-methylbenzimidazole and 5-chlor-2-(2,4,5-trichlorophenoxymethyl)benzimidazole were in separate operations added to samples of bacteriological media to give a concentration of 0.5 percent by weight in the media and the resulting media separately inoculated with *Staphylococcus aureus* and *Bacillus subtilis*, and incubated at 30° C. for 3 days. At the end of this period, complete inhibition of growth of the organism was observed in each case.

The compounds of the present invention also have very interesting pharmacological properties rendering them a useful tool for laboratory studies in exploring the mechanism of drug action. Many of the compounds of the present invention are useful for antagonizing the effects of the cardiovascular hormones of the posterior pituitary gland. Thus, products are effective antagonists of the pressor effects of vasopressin. They may be employed to explore the vascular effects of various hormones and drugs. It has been found that the action of many of the compounds is exerted upon the vasomotor control centers of the central nervous system to produce a reflex vasodilation of the peripheral vascular system in the face of elevation of systemic blood pressure by such hormones. For example, very small amounts of 5-methyl-2-(3,5-xylyloxymethyl)benzimidazole or 5-nitro-2-(p-toloxymethyl)benzimidazole have been found to prevent the pressor action of vasopressin. Particularly unique and unexpected is, that in contrast to many other drugs affecting the hormonal properties of vasopressin which drugs also affect the antidiuretic action of vasopressin, the compounds of the present invention have selective effect on the pressor action without affecting the antidiuretic action. Thus, a valuable laboratory tool is provided for effecting a separation of action of the hormones.

Certain of the compounds of the present invention show on entirely new pharmacological phenomenon rendering them useful in studies of hypotensive crisis occurring in dogs as a result of intravenous administration of certain high molecular weight polymeric carbohydrates. Thus, 2-(4-ethoxyphenoxymethyl)-5 - methylbenzimidazole hydrochloride salt is effective in very minor amounts in reversing the hypotensive crisis above described. These actions have heretofore been unknown and provide useful tools for development of allergenic studies.

The reactant phenoxylakanoic acids may be prepared by heating together the appropriately substituted phenol and bromoalkanoic acid in the presence of aqueous sodium hydroxide, cooling, neutralizing the mixture to pH of 6 to precipitate the desired phenoxyalkanoic acid reactants.

The reactant o-phenylenediamines are known in the art and may be prepared by various methods reported in the literature. It may conveniently be prepared from the corresponding chloro or nitro compound wherein the chloro group is aminated by heating at autogenous pressure with ammonia and the nitro group is reduced by heating in a bomb at about 30° C. with hydrogen in the presence of Raney nickel catalyst at pressures of about 500 pounds per square inch.

We claim:
1. A benzimidazole compound selected from the group consisting of (a) compounds having the formula

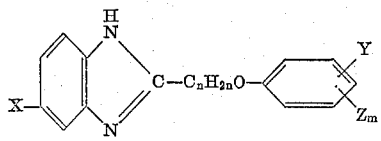

wherein X is selected from the group consisting of lower alkyl, chloro, bromo, nitro, amino, sulfamyl and phenyl; Y is selected from the group consisting of hydrogen, lower alkyl, lower alkoxy, hydroxy, chloro and bromo; Z is selected from the group consisting of hydrogen, methyl, chloro and bromo; $m$ and $n$ are integers of from 1 to 2, inclusive; and (b) mineral acid salts of (a).

2. 5-methyl-2-(3,5-xylyloxymethyl)benzimidazole.
3. 2-(2-ethoxyphenoxymethyl)-5-methylbenzimidazole.
4. 5-methyl-2-(2-(3,5-xylyloxy)ethyl)benzimidazole.
5. 2 - (4 - methoxyphenoxymethyl) - 5 - methylbenzimidazole.
6. 2 - (2,4 - dichlorophenoxymethyl) - 5 - methylbenzimidazole.
7. 5 - chloro - 2 - (2,4,5 - trichlorophenoxymethyl) benzimidazole.
8. 2 - (3,5 - dibromophenoxymethyl) - 5 - methylbenzimidazole.
9. 5-methyl-2-(2,5-xylyloxymethyl)benzimidazole.
10. 5-methyl-2-(4-toloxymethyl)benzimidazole.
11. 5 - chloro - 2 - (4 - chlorophenoxymethyl)benzimidazole.
12. 5-nitro-2-(p-toloxymethyl)benzimidazole.
13. 5-methyl-2-phenoxymethylbenzimidazole.

References Cited by the Examiner
UNITED STATES PATENTS

| | | | |
|---|---|---|---|
| 3,004,982 | 10/61 | Hoffmann et al. | 260—309.2 |
| 3,097,132 | 7/63 | Wiegand et al. | 167—33 |

FOREIGN PATENTS

| | | |
|---|---|---|
| 243,766 | 7/26 | Great Britain. |
| 830,650 | 3/60 | Great Britain. |
| 1,064,451 | 5/54 | France. |

IRVING MARCUS, *Primary Examiner.*

NICHOLAS S. RIZZO, WALTER A. MODANCE, *Examiners.*

UNITED STATES PATENT OFFICE
CERTIFICATE OF CORRECTION

Patent No. 3,182,070　　　　　　　　　　　　　　　　　　May 4, 196

Clarence L. Moyle et al.

It is hereby certified that error appears in the above numbered patent requiring correction and that the said Letters Patent should read as corrected below.

Column 2, lines 20 and 21, for "compounds" read -- compound --; line 40, for "phenoxylalkanoic" read -- phenoxyalkanoic --; lines 60 to 65, the formula should appear as shown below instead of as in the patent:

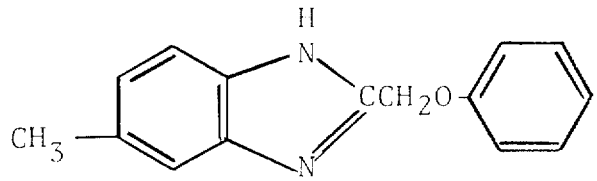

column 4, TABLE 1, second column, ninth line from the bottom for "228 229" read -- 228-229 --; column 5, TABLE II, first column, line 4 thereof, for "5-Chloro-2-(4-" read -- 5-Chloro-2-(2- --; same table, same column, line 6 thereof, fo " 5-Chloro-2-(4,6-" read -- 5-Chloro-2-(2,6- --; column 7, line 15, for "hydrozen" read -- hydrogen --.

Signed and sealed this 10th day of May 1966.

(SEAL)
Attest:

ERNEST W. SWIDER　　　　　　　　　　　　　　EDWARD J. BRENNER
Attesting Officer　　　　　　　　　　　　　　Commissioner of Paten